United States Patent
Wiesmann et al.

(10) Patent No.: US 10,232,679 B2
(45) Date of Patent: Mar. 19, 2019

(54) AIR DEFLECTOR DEVICE OF AN AIR CONDITIONING SYSTEM FOR AN AUTOMOBILE

(71) Applicant: Halla Visteon Climate Control Corp., Daejeon (KR)

(72) Inventors: Ralph Wiesmann, Euskirchen (DE); Torsten Klein, Köln (DE); Antonio Marques, Koenigswinter (DE)

(73) Assignee: HANON SYSTEMS, Daejeon-si (KR)

( * ) Notice: Subject to any disclaimer, the term of this patent is extended or adjusted under 35 U.S.C. 154(b) by 511 days.

(21) Appl. No.: 14/683,162

(22) Filed: Apr. 10, 2015

(65) Prior Publication Data

US 2015/0291000 A1 Oct. 15, 2015

(30) Foreign Application Priority Data

Apr. 10, 2014 (DE) .................. 10 2014 105 115

(51) Int. Cl.
*B60H 1/00* (2006.01)

(52) U.S. Cl.
CPC ....... *B60H 1/0005* (2013.01); *B60H 1/00064* (2013.01); *B60H 1/00685* (2013.01)

(58) Field of Classification Search
CPC ............ B60H 1/00664; B60H 1/00671; B60H 1/00842; B60H 1/00835; B60H 1/0005; B60H 1/00064; B60H 1/00685; B60H 1/00057; B60H 2001/3485
USPC ........................... 454/69, 155, 152, 159–161
See application file for complete search history.

(56) References Cited

U.S. PATENT DOCUMENTS

| | | | | |
|---|---|---|---|---|
| 5,106,018 A | * | 4/1992 | Loup ............ | B60H 1/00678 165/204 |
| 5,676,595 A | * | 10/1997 | Sumiya .......... | B60H 1/00042 454/121 |
| 2011/0171897 A1 | * | 7/2011 | Tsutsumi ........ | B60H 1/00671 454/141 |
| 2012/0248205 A1 | * | 10/2012 | Klinkhammer ... | B60H 1/00671 236/49.1 |

FOREIGN PATENT DOCUMENTS

| | | |
|---|---|---|
| DE | 19603126 A1 | 8/1996 |
| EP | 1336517 A1 | 8/2003 |
| JP | 2000108636 A | 4/2000 |

(Continued)

*Primary Examiner* — Steven B McAllister
*Assistant Examiner* — Ko-Wei Lin
(74) *Attorney, Agent, or Firm* — Shumaker, Loop & Kendrick, LLP; James D. Miller (57) ABSTRACT

The invention relates to an air deflector device for an air conditioning system in a motor vehicle. The air deflector device has at least one closure element and at least one air mixing element. The closure element and the air mixing element have a common rotational axis in the air deflector device. The closure element extends in the direction of the rotational axis across the entire depth of a cross-section of a flow passage to be closed off in the air conditioning system, and comprises retaining elements.

The air mixing element, which extends in the direction of the rotational axis, is embodied according to the invention with cross-flow openings, so that a cross-section of at least one flow passage of the air conditioning system can be adjusted based on the position of the air deflector device.

8 Claims, 4 Drawing Sheets

(56) References Cited

FOREIGN PATENT DOCUMENTS

| JP | 2000190722 A | 7/2000 |
| JP | 2004136772 A | 5/2004 |
| JP | 2009286348 A | 12/2009 |

* cited by examiner

AIR DEFLECTOR DEVICE OF AN AIR CONDITIONING SYSTEM FOR AN AUTOMOBILE

CROSS-REFERENCE TO RELATED APPLICATIONS

This application claims priority to German Non-Provisional Patent application Serial No. DE 10 2014 105 115.7 filed Apr. 10, 2014, hereby incorporated herein by reference in its entirety.

FIELD OF THE INVENTION

The invention relates to an air deflector device for an air conditioning system in a motor vehicle. The air deflector device has at least one closure element, at least one air mixing element and a rotational axis.

The invention further relates to an air conditioning system for a motor vehicle, comprising means for conveying, for cooling, and for heating air along with the air deflector device.

BACKGROUND

Due to the increasing number of technical components being used in motor vehicles, it is necessary to optimize the installed size of these components in order to ensure the desired functionality that is achieved by incorporating the components. For instance, large-volume air conditioning components, such as are known in the form of mixing chambers, flow deflector devices and swirling devices in stationary air conditioning systems, cannot be used in motor vehicles due to the limited space conditions.

As an added requirement, automotive air conditioning systems, which are used to condition an infed flow of air, divide said flow if necessary, and channel the individual air flows into different regions of the vehicle, must supply air flows at different temperatures to different air vents in the air conditioning system, depending on the position and function of these vents. In this process, the infed flow of air is guided across various heat exchangers so that the air can be cooled and dehumidified and, if necessary, reheated before being channeled into the passenger compartment. For example, the air is blown into the footwell and via openings in the dashboard into the passenger compartment, and is also guided through vents directly to the windshield for defogging or defrosting the windshield. In generic air conditioning systems which are controlled in terms of air flow, the air flow to be supplied to the passenger compartment is divided into two partial air flows by means of a damper, also called a temperature control damper. The desired temperatures of the air flows are adjusted by means of the temperature control damper and various control mechanisms. In this process, one partial air flow is channeled through a heating heat exchanger located in the lower portion of the system and is heated. At the same time, the second partial air flow bypasses the heating heat exchanger as cold air. The two partial air flows at different temperatures are then combined in order to achieve the desired set temperature.

In conventional air conditioning systems, the partial air flows are not optimally mixed. When the temperature control damper is in an intermediate position, air at different temperatures is delivered to the various air vents in the passenger compartment. The varying temperatures in the air flows at the different vents, for example the footwell vents, dashboard vents and window vents, is referred to as air stratification.

To decrease stratification between certain vents, warm air ducts are provided specifically for deflecting warm air to the vent at the windshield, for example; as added elements, these ducts adversely affect the air flow rate and acoustics, and at the same time result in higher costs.

Other known air conditioning systems have a temperature control damper combined with an enlarged mixing zone, which are designed to channel the cold air flow in the direction of the warm air flow, and to guide the air flows through the enlarged mixing zone to ensure adequate mixing. Thorough mixing is achieved in this case due to the size of the mixing zone. Alternatively or additionally, some air conditioning systems are designed with baffle plates or deflection plates, particularly in the mixing zone area, as restricting elements or throttling elements that are designed to generate turbulence within the air flow to be mixed. The added plates which decrease the flow cross-section for the air flow increase the flow rate. At the same time, pressure losses also increase.

It is likewise known in the prior art to design air conditioning systems such that the warm air flow and the cold air flow are channeled to meet one another head-on and are then mixed with one another to ensure better blending.

Other embodiments of conventional systems comprise deflection plates which dam the various air flows at certain locations within the system as needed, block passage, and prevent the air from flowing through.

The baffle plates, deflection plates, restricting elements, and throttling elements may be formed on the temperature control damper itself, for example.

Also known in the prior art are systems having more than two flow paths for the air, in which the air has different temperatures within the flow paths.

EP 1 336 517 A1 discloses an air conditioning system having an evaporator arranged in an air duct, and a heating heat exchanger arranged downstream in the direction of air flow. The air flow conditioned in the evaporator can then be divided into three different flow paths, with one flow path acting as the warm air duct and deflecting the air through the heating heat exchanger and the other two flow paths acting as cold air ducts or as bypasses and each deflecting the air past the heating heat exchanger. The various flow paths serve to avoid heavy stratification, resulting in an improved temperature distribution in the air flow.

However, said air conditioning system, which comprises sliding dampers and/or rotatable dampers along with the associated drive technology, requires a structurally highly complex control of the air flow through and/or around the heating heat exchanger. Moreover, the air conditioning system is designed with a plurality of mixing chambers and requires substantial installation space.

Alternative designs for air conditioning systems having a plurality of sliding dampers and/or rotating dampers and the drive technology associated with each of these are known in the prior art.

For instance, DE 196 03 126 A1 discloses an automotive air conditioning system designed for selectively opening at least three vents. The air conditioning system comprises a housing, a rotary shaft mounted rotatably in the housing, and an arcuate rotary door, which is connected to the rotary shaft. The rotary door has a plurality of openings and a drive means for rotating the rotary shaft. The housing is designed with a plurality of ducts that lead to the vents, the intake openings of which are arranged along the circumferential surface of the rotary door. The intake openings of the ducts are closed and/or opened by means of the rotary door, allowing the flow of air coming from a mixing chamber and having a uniform temperature to be divided among a plurality of ducts.

A common feature of the systems known in the prior art is that they involve additional, highly costly elements which require additional space and added expense, along with additional assembly expenditure and corresponding maintenance costs. The additional fixtures also create boundaries and narrowed areas in the flow passages, resulting in increased air flow pressure losses, which in turn leads to increased power requirements and thus increased energy consumption, and to a decrease in the efficiency of the air conditioning system and thus of the entire vehicle.

In addition to significant flow losses, the damper geometries known from the prior art also produce loud flow noises. Pivoting the dampers can generate vibrations.

The object of the present invention is to provide an air conditioning system which offers both optimal blending with minimal stratification in terms of air flow temperatures, and minimal expenditure on temperature control, in accordance with requirements. In particular, the system should ensure that the flow of air in one of the main flow directions, in which no or only slight blending of the air flows is required, is not influenced or is minimally influenced, while at the same time a duct for a second flow of air is at least partially closed. In this system, the air should be selectively channeled, and both the number of components used and the amount of installation space required should be minimal. The costs of producing, assembling and maintaining said system should be minimal.

SUMMARY

The object is attained by an air deflector device according to the invention for an air conditioning system in a motor vehicle. The air deflector device has at least one closure element and at least one air mixing element. The closure element and the air mixing element share a common rotational axis in the air deflector device. The closure element extends in the direction of the rotational axis across the entire depth of a cross-section of a flow passage to be closed in the air conditioning system, and comprises retaining elements.

According to the concept of the invention, the at least one closure element and the at least one air mixing element are mounted so as to be freely rotatable about a common rotational axis, and are rigidly connected to one another. The air mixing element, which extends in the direction of the rotational axis, is designed according to the invention with cross-flow openings, so that, depending on the position of the air deflector device, a cross-section of at least one flow passage of the air conditioning system is adjustable, in particular reducible.

The air conditioning system advantageously has at least one cold air path and at least one warm air path as flow passages, for example, with the cross-section of at least one of the flow passages of warm air path and/or cold air path being adjustable based on the position of the air deflector device.

According to an advantageous embodiment of the invention, the air deflector device has a plurality of air mixing elements. The air mixing elements are arranged spaced from one another in the direction of the rotational axis such that in each case an open space is formed between the air mixing elements as a cross-flow opening for an air flow.

A plurality of air mixing elements is understood as more than one air mixing element, that is, two or more air mixing elements.

According to one embodiment of the invention, the closure element and the air mixing element or the closure element and the air mixing elements are arranged offset at an angle from one another around the common rotational axis of the air deflector device.

When a plurality of air mixing elements are provided, these elements are advantageously aligned in a common direction and are designed as equal in length in the direction of the rotational axis.

The air deflector device advantageously comprises a shaft having a longitudinal axis, with the longitudinal axis of the shaft corresponding to the rotational axis of the air deflector device.

According to a first alternative embodiment of the invention, the at least one air mixing element or the air mixing elements is/are arranged on the shaft.

The air mixing element advantageously has a convexly shaped inflow surface in relation to the rotational axis of the air deflector device. Since the air mixing element is arranged upstream of the rotational axis in the direction of air flow, the inflow surface for the incoming flow of air is concave in shape.

The inflow surface of the air mixing element also preferably has flow profiles or cross-flow openings.

It is advantageous for the region of the air mixing element that forms the inflow surface to be provided with retaining elements, arranged perpendicular to the rotational axis, at the ends of said element that are aligned in the direction of the rotational axis. The retaining elements are rigidly connected to the region of the air mixing element that forms the inflow surface, and are rigidly connected to the shaft.

According to a second alternative embodiment of the invention, the at least one air mixing element or the air mixing elements are each designed with a straight planar region and four side edges, one of the side edges being arranged directly on the shaft as an end face. The air mixing element in this case is rigidly connected to the shaft.

Alternatively, the air mixing element can also be arranged on the retaining elements of the closure element. In this case, the air mixing element is rigidly connected to the retaining elements of the closure element.

According to a further development of the invention, the air mixing element is designed as comprising a wall element at an end face that faces away from the shaft. In this case, the length of the wall element advantageously corresponds to the width of the air mixing element. The wall element is preferably arranged perpendicular to the air mixing element.

As an alternative to forming the wall elements at the end face of the air mixing elements, the wall elements can also be arranged on the housing. In this case, the wall elements are advantageously arranged spaced from one another in the direction of the rotational axis of the air deflector device such that the cross-section of the flow passage of the air conditioning system is reduced.

The air mixing elements formed with a straight planar region are preferably aligned parallel to one another. Alternatively, the air mixing elements formed with a straight planar region can also be arranged relative to one another such that a convex inflow surface is formed in relation to the rotational axis of the air deflector device.

The object is further attained by an air conditioning system according to the invention for a motor vehicle. The air conditioning system comprises means for conveying and for conditioning air, in particular for cooling, heating and dehumidifying air, and comprises a housing with air vents and two flow paths. The flow paths open up into a common mixing chamber.

A flow of air channeled through the first flow path as a partial air flow or as a proportion of the total air flow conveyed in the air conditioning system has a first temperature, and a partial air flow guided through the second flow path has a second temperature. The air flows can be channeled through the flow paths and the mixing chamber to the air vents.

According to the concept of the invention, an air deflector device as described above according to the invention is arranged inside the mixing chamber.

According to a first alternative embodiment of the invention, the rotational axis of the air deflector device and the air mixing elements are arranged at the margin of or outside of a flow of air being channeled through the mixing chamber.

According to a second alternative embodiment of the invention, the rotational axis of the air deflector device and the air mixing elements are arranged within or outside of an air flow being channeled through the mixing chamber, depending on the position of the air deflector device. When the air deflector device is in a position in which the air mixing elements are located within the air flow, the air mixing elements are aligned parallel to the air flow direction.

When the air mixing elements are arranged at the margin, outside of or within an air flow being channeled through the mixing chamber as the main flow of air, the air resistance to the main flow of air is minimal and negligible.

The means for conveying the air is preferably embodied as a fan, the means for cooling the air is preferably embodied as an evaporator of a refrigerant circuit and the means for heating the air is preferably embodied as a heating heat exchanger. The fan, the evaporator and the heating heat exchanger are arranged inside the housing.

According to one advantageous embodiment of the invention, the heating heat exchanger is arranged within one of the two flow paths and occupies the entire cross-section of the flow path. The contact faces between the heating heat exchanger and the walls of the flow path form a technically tight seal, so that the entire partial air flow being channeled through the flow path is guided across the heat exchange surfaces of the heating heat exchanger. The other of the two flow paths is preferably designed as a bypass around the heating heat exchanger. The air flow channeled through the bypass therefore does not come into contact with the heat exchange surfaces of the heating heat exchanger.

The solution according to the invention comprises an air deflector device having air mixing elements for guiding and deflecting or for at least partially blocking cold and/or warm air flows within the air conditioning system in order to achieve optimal mixing of the air flows. In this process, the air mixing elements serve to generate turbulence in the region of the mixing chamber and to channel the air flows to meet one another directly or head-on. The air mixing elements are designed, for example, as baffle plates, deflection plates, narrowing elements, integrated flow passages or throttling elements, or combinations thereof in different numbers and arrangements.

The air deflector devices, in the form of narrowed cross-sections of a flow passage or in the form of air baffle plates, are preferably arranged in a space-saving manner on an air damper of an air vent such that during operation in the modes most commonly used, that is, in the main air flow directions, the air flows are not affected or are only slightly affected. The air resistance generated by the air deflector device is negligible. As a result, the additional output required from the fan is not impacted or is only slightly impacted.

The primary operating modes include "cold air to dashboard air vent", "warm air to windshield air vent" and "warm air to footwell air vent".

In the "cold air to dashboard air vent" operating mode, the air mixing element of the air deflector device according to the invention is arranged outside of or parallel to the flow of cold air from the cold air path, and in the "warm air to windshield air vent" and "warm air to footwell air vent" operating modes, the air mixing element is arranged outside of or parallel to the flow of warm air from the warm air path. When operating modes are switched, the alignment and/or the orientation of the air deflector device and therefore of the closure element and the air mixing element is changed.

The common rotational axis of air mixing element and closure element advantageously allows the operating mode of the air deflector device in the warm air path and the cold air path to be varied based on the air vent operating mode.

The solution according to the invention has various additional advantages.

A first advantage of the invention is that the temperature of the air flow can be adjusted with minimal effort at temperature control using a single air deflector device, and additional components and fixtures, such as warm air ducts, are dispensed with.

Another advantage is that the number of components is reduced, and therefore, in addition to lowering material and production costs, maintenance and repair costs are lowered. Additionally, minimizing the number of components reduces the amount of installation space required.

Further, the efficiency of the air conditioning system is increased by the selective arrangement within the flow paths of the components that reduce the cross-section of the flow paths.

Air stratification is decreased by an optimal blending of the air flow, offering maximum comfort to the passengers in the passenger compartment.

BRIEF DESCRIPTION OF THE FIGURES

Additional details, features and advantages of the invention are presented in the following description of embodiments, with reference to the attached set of drawings. In the figures:

FIG. 2 shows an air conditioning system comprising an air deflector device with an air mixing element in a "cold air to dashboard air vent" operating mode, in which setting the flow of air from the cold air path flows in the main flow direction and the flow of air from the warm air path is added in;

FIG. 3 shows an air conditioning system comprising an air deflector device with an air mixing element in a "warm air to windshield air vent" operating mode, in which setting the flow of air from the warm air path flows in the main flow direction and the flow of air from the cold air path is added in;

FIG. 7 shows mixing chamber and air vents of an air conditioning system comprising an air deflector device with air mixing elements in the "cold air to dashboard air vent" operating mode, in which setting the flow of air from the cold air path flows in the main flow direction and the flow of air from the warm air path is added in;

FIG. 8 shows mixing chamber and air vents of an air conditioning system comprising an air deflector device with air mixing elements in the "warm air to windshield air vent" operating mode, in which setting the flow of air from the warm air path flows in the main flow direction and the flow of air from the cold air path is added in.

DETAILED DESCRIPTION OF THE INVENTION

Figure 1:
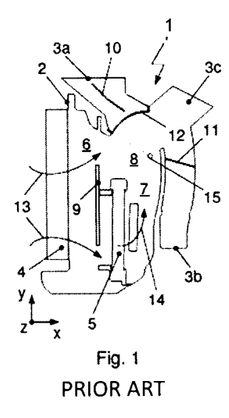
FIG. 1 shows an air conditioning system with an air damper, according to the prior art.

FIG. 1 shows an air conditioning system 1 comprising an air damper 12 from the prior art. The air conditioning system 1 has a fan (not shown) for taking in and conveying the air in a direction of flow 13 through air conditioning system 1, an evaporator 4 and a heating heat exchanger 5, which are arranged in a housing 2. The housing 2 comprises a windshield air vent 3a, a footwell air vent 3b, a dashboard air vent 3c, and a mixing chamber 8.

The entire flow of air taken in by the fan and channeled in the direction of flow 13 to the evaporator 4 is guided across the heat exchange surfaces of the evaporator 4 and is then divided proportionally between two flow paths 6, 7. The first flow path 6, also referred to as a cold air path 6, channels the air that has been cooled and/or dehumidified in the evaporator 4 as a partial air flow around the heating heat exchanger 5. In this case, the first flow path 6 is arranged above heating heat exchanger 4 in a vertical direction y of air conditioning system 1, and the heat exchanger is arranged within the second flow path 7. The entire partial air flow, which is channeled through the second flow path 7, is guided across the heat exchange surfaces of the heating heat exchanger 5 and is heated. The second flow path 7 is therefore also referred to as a warm air path 7.

Each of flow paths 6, 7 opens up into the mixing chamber 8. The partial air flows divided between the flow paths 6, 7 are recombined in the mixing chamber 8 and are mixed, after which the air, which is now conditioned, is fed through the individual air vents 3a, 3b, 3c into the passenger compartment.

The air flow guided across the evaporator 4 is divided into the partial air flows to the flow paths 6, 7 by means of a temperature control damper 9, which in this case is designed as a sliding element. By adjusting the temperature control damper 9, the partial air flows through flow paths 6, 7, in other words the proportions of the entire flow of air being guided through the air conditioning system 1, and therefore the temperature at air vents 3a, 3b, 3c, can be controlled.

The windshield air vent 3a and the footwell air vent 3b can be closed or opened by means of a windshield air damper 10 and a footwell air damper 11, respectively. According to FIG. 1, the air dampers 10, 11 are aligned such that the windshield air vent 3a is open and the footwell air vent 3b is closed.

A dashboard air damper 12 for opening and closing the dashboard air vent 3c is arranged such that the air vent 3c is open, whereas the windshield air vent 3a is closed. The dashboard air vent 3c is also referred to as the passenger or driver vent, since the air flow channeled through the dashboard air vent 3c can flow directly toward the vehicle occupants.

The dashboard damper 12, which is arcuate in cross-section along the plane spanned by a horizontal direction x and the vertical direction y, is mounted so as to rotate around a rotational axis 15, and extends in a depth direction z.

In the arrangement shown in FIG. 1 with the temperature control damper 9 open, the air flow is divided between the flow paths 6, 7. The first partial air flow channeled through the cold air path 6 and the second partial air flow channeled in a direction of flow 14 through warm air path 7 are mixed in the mixing chamber 8 and channeled through the dashboard air vent 3c into the passenger compartment.

Figure 2:
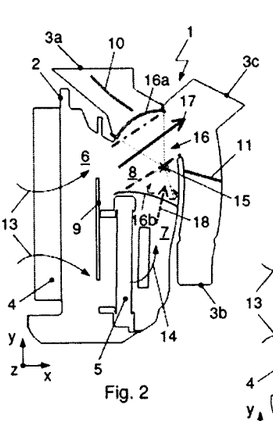

FIG. 2 shows an air conditioning system 1 comprising an air deflector device 16 with an air mixing element 16b in the "cold air to dashboard air vent" operating mode, in a setting in which the flow of air being channeled through the cold air path 6 is guided in the main flow direction, that is in a flow direction 17, with the flow of air from the warm air path 7 being added in, to the dashboard air vent 3c. The windshield air vent 3a is closed off by the air deflector device 16 and the footwell air vent 3b is closed off by the footwell air damper 11. The air mixing element 16b serves to narrow the cross-section of the flow passage.

The air deflector device 16 comprises a closure element 16a and the air mixing elements 16b, which are mounted on a common rotational axis 15. The closure element 16a and the air mixing elements 16b are rigidly connected to one another. The air mixing elements 16b are arranged within the flow of air as flow resistors, thus they are also referred to as air resistance elements.

The closure element 16a, which is arcuate in cross-section along the plane spanned by the horizontal direction x and the vertical direction y, and the air mixing elements 16b each extend in the depth direction z, with the closure element 16a extending across the entire depth of each flow passage to be closed off, and with the air mixing elements 16b being arranged spaced from one another in such a way that the cross-section of the respective passage is merely narrowed. In relation to the rotational axis 15, the closure element 16a is designed as concave and the air mixing elements 16b are designed as convex. The description of the concave shape of the closure element 16a and the convex shape of the air mixing elements 16b relates to the respective inflow surfaces thereof. As viewed from the air flow directions 13, 17, 18 through the mixing chamber 8, the air mixing elements 16b are arranged upstream of the rotational axis 15 and the closure element 16a is arranged downstream of the rotational axis 15, and therefore each of the inflow surfaces in the air flow directions 13, 17, 18 is designed as concave.

Thus while the closure element 16a, according to the arrangement of FIG. 2, fully closes off the flow passage in the direction of the windshield air vent 3a, the air mixing elements 16b decrease the flow cross-section of the warm air path 7, causing the flow of air flowing in the flow direction 18 through the warm air path 7 to swirl upon entering the mixing chamber 8, thereby mixing optimally with the flow of air flowing through the cold air path 6. No obstruction to flow in the form of air deflector elements is present in the flow direction 17 for the cold air. The rotational axis 15 of the air deflector device 16 is positioned at the margin of the main flow of air from the cold air path 6 to the air vent 3c, indicated by dotted-dashed lines, and does not influence the air flow or influences it only negligibly.

In the setting of the air deflector device 16 shown in FIG. 2 in which the dashboard air vent 3c is open, the air mixing elements 16b are arranged outside the cold air path 6 in the transition area from warm air path 7 to mixing chamber 8.

According to an alternative arrangement (not shown), the temperature control damper 9 is positioned at the bottom in the vertical direction y, closing off the warm air path 7, so that the entire flow of air being conveyed through the housing 2 is channeled substantially without flow resistance through the cold air path 6 to the dashboard air vent 3c. This arrangement corresponds to the primary operating mode for rapid cooling of the passenger compartment. In this case, a high output of cold air delivered through the cold air path 6 in its maximum open setting is desirable.

Figure 3:
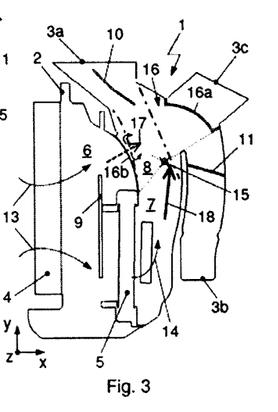

FIG. 3 shows air conditioning system 1 according to FIG. 2 comprising the air deflector device 16 with a plurality of the air mixing elements 16b in the "warm air to windshield air vent" operating mode, in a setting in which the air flow being channeled through warm air path 7 is guided in the main flow direction, with the air flow from cold air path 6 being added in, to windshield air vent 3a. The air channeled through the air vent 3a is used, for example, for defrosting an ice-covered windshield or for drying a fogged windshield. The dashboard air vent 3c is closed off by the closure element 16a of the air deflector device 16 and the footwell air vent 3b is closed off by the air damper 11. The air mixing element 16b serves to narrow the cross-section of the flow passage.

While the closure element 16a completely closes off the flow passage in the direction of the air vent 3c, the air mixing elements 16b decrease the flow cross-section of the cold air path 6, causing the flow of air flowing in the direction of flow 17 through the cold air path 6 to swirl upon entering the mixing chamber 8, thereby mixing optimally with the flow of air flowing through the warm air path 7. The rotational axis 15 of air deflector device 16 is again positioned near the margin of the main flow of air from the warm air path 7 to the air vent 3a, represented by dotted-dashed lines, and therefore has only a negligible influence on the flow of air.

In the setting of air deflector device 16 shown in FIG. 3 with the dashboard air vent 3c closed, the air mixing elements 16b are arranged outside of the warm air path 7 in the transition area from the cold air path 6 to the mixing chamber 8.

In a first alternative arrangement (not shown), the flow of air channeled through the warm air path 7, to which the flow of air from the cold air path 6 is added, is channeled in the main flow direction to the footwell air vent 3b. The air footwell damper 11 is open. The windshield air vent 3a is closed off by the windshield air damper 10 and the dashboard air vent 3c is closed off by the closure element 16a of air deflector device 16.

According to a second alternative arrangement (not shown), both of the air dampers 10, 11 are open, so that the air flow exiting the mixing chamber 8 is channeled proportionally through the windshield air vent 3a and through the footwell air vent 3b.

Independently of the arrangements described, the temperature control damper 9 can be arranged in the vertical direction y, for example closing off the cold air path 7 so that the entire flow of air taken into the housing 2 is channeled through the warm air path 7. These described arrangements represent the main operating modes for rapidly heating a vehicle. The goal in this case is a high warm air delivery capacity, with an open warm air path 7 being advantageous.

Figure 4:
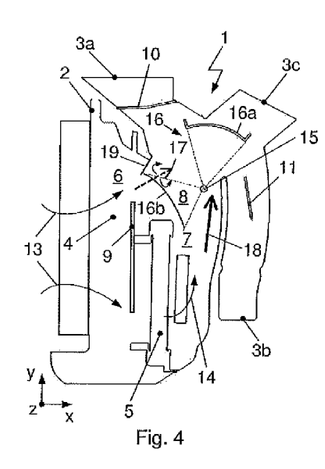
FIG. 4 shows an air conditioning system comprising an air deflector device with an additional wall element as part of the housing.

FIG. 4 shows the air conditioning system 1 comprising the air deflector device 16 and, in contrast to the embodiment according to FIG. 3, having additional wall elements 19 as parts of the housing 2.

The additional wall elements 19 serve to improve the blending of the air flows being channeled through the warm air path 7 and the cold air path 6, particularly in the operating modes of the air conditioning system 1 in which the of air vents 3a, 3b, 3c are open, such as dashboard and footwell according to FIG. 4, or windshield and dashboard, that is, with air damper 10 also open and air damper 11 closed, or dashboard and footwell and windshield, that is, with air dampers 10, 11 also open. Wall elements 19 are arranged spaced from one another in the depth direction z such that the cross-section of cold air path 6 is narrowed, and are designed such that they abut against air mixing elements 16b in the arrangement according to FIG. 4.

In contrast to air conditioning system 1 according to FIG. 3, air mixing elements 15b abut on one side against additional wall elements 19. Due to the modified end position of air deflector device 16, air mixing elements 16b project on the other side into warm air path 7, and closure element 16a does not completely close off dashboard air vent 3c.

Figures 5A, 5B:
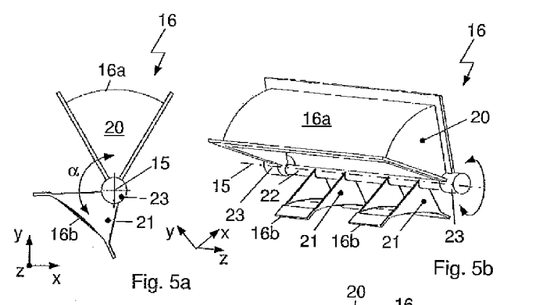
FIGS. 5a to 5c show an air deflector device from a side view and a perspective view with closure element and elements for air mixing.
Figure 5C:
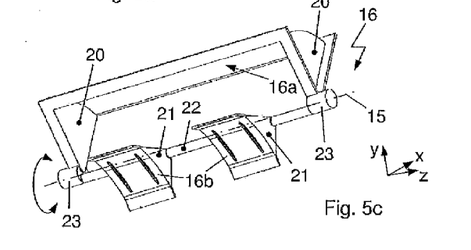

FIGS. 5a to 5c show a side view and perspective views of air deflector device 16, with the closure element 16a and the air mixing elements 16b as elements for intensifying air mixing. The closure element 16a and the air mixing elements 16b are arranged rigidly around the common rotational axis 15, offset relative to one another by an angle α. The air mixing elements 16b are arranged aligned with one another in the direction of the rotational axis 15.

The closure element 16a, embodied as a pivot damper, is designed as a section of wall of a hollow circular cylinder, which is arranged to rotate around the rotational axis 15 as a suitable closed surface. In this case, the geometry of the closure element 16a is based on the shape of the air vent to be closed off.

In the section of the wall of the hollow circular cylinder, the respectively opposite edges extend rectilinearly, parallel to one another and spaced the same distance, that is, with the same radius, from the rotational axis 15. The closure element 16a is designed as a closed surface in the depth direction z, and as concave in relation to the rotational axis 15.

The ends of the hollow, circular-cylindrical closure element 16a, aligned in the direction of the rotational axis 15, are designed as arc-shaped retaining elements 20, arranged perpendicular to the rotational axis 15. The central angle of each of the retaining elements 20 corresponds to the angular range of the hollow cylindrical wall of the closure element 16a. The height of the arc-shaped retaining elements 20 is equal to the radius of the arc formed by the closure element 16a. The retaining elements 20 are connected to one another at the level of the rotational axis 15 by means of a shaft 22, which is aligned in the direction of the rotational axis 15. The closure element 16a is therefore coupled via the retaining elements 20 to the shaft 22.

The air mixing elements 16b, which are convex in relation to the rotational axis 15 and are concave in relation to the directions of flow 13, 17, 18, are arranged spaced from one another in the depth direction z, so that open spaces are formed between the air mixing elements 16b. The air mixing elements 16b are equal in length in the direction of the rotational axis 15 or in the depth direction z. The angular ranges, defined by the air mixing elements 16b, of each of the walls directed toward the flow of air are equal in size and can be provided with additional profiles or openings for deflecting or for allowing the passage of air flow.

According to an alternative embodiment (not shown), the air mixing elements 16b may differ, for example, in terms of their length, their defined angular range and/or their profiles and/or openings.

The ends of the air mixing elements 16b that are aligned in the direction of the rotational axis 15 are designed with the retaining elements 21, arranged perpendicular to the rotational axis 15. The retaining elements 21 are rigidly connected to the shaft 22.

Each end of the shaft 22, that is, in the region of the retaining elements 20 of the closure element 16a, has a bearing element 23. The bearing elements 23 are designed as cylindrical journals. The rotational axis 15 and the axes of the bearing elements 23 are congruent.

When air flows through the air deflector device 16, only the shaft 22, designed as a cylindrical rod, and the narrow edges of the retaining elements 21 of the air mixing elements 16b oppose the flow of air in the main directions of flow 13, 17, 18, and the loss of pressure resulting from air flowing around the shaft 22 and the retaining elements 21 is minimal.

As an alternative, a more stable embodiment of the retaining elements 20 and the closure element 16a may replace the design involving the shaft 22. In this case, air mixing elements 16b and the bearing elements 23 are arranged on the retaining elements 20 of the closure element 16a.

Figure 6:
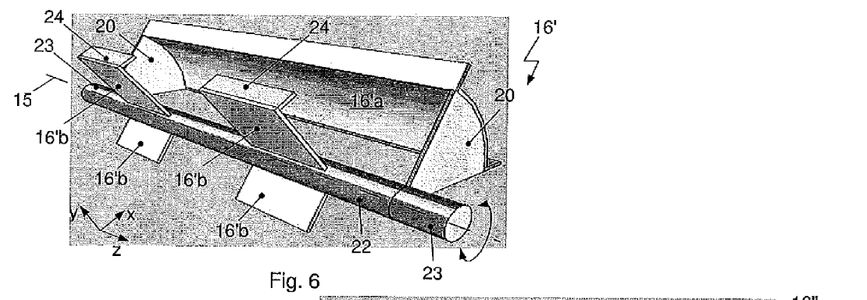
FIG. 6 shows an alternative embodiment of an air deflector device from a perspective view, with closure element and elements for air mixing.

FIG. 6 shows a perspective view of an alternative embodiment of an air deflector device 16', with a closure element 16'a and air mixing elements 16'b. The mixing elements 16'b are embodied as air resistance elements, as in the embodiment shown in FIGS. 5a to 5c.

In contrast to air deflector device 16 from FIGS. 5a to 5c, however, air mixing elements 16'b are designed with a straight planar region and four side edges, without additional retaining elements. The air mixing elements 16'b are each arranged with one end face directly on the shaft 22, but likewise have a convex shape overall in relation to the rotational axis 15 or in cross-section within the plane spanned by the horizontal direction x and the vertical direction y, and are arranged spaced from one another in depth direction z, so that open spaces are formed between the air mixing elements 16'b. The air mixing elements 16'b are equal in length in the depth direction z. The angular ranges, defined by the air mixing elements 16'b, of the walls facing the respective flow of air are equal in size. According to an alternative embodiment (not shown), the air mixing elements 16'b may differ in terms of their length and/or their defined angular range, for example.

The air mixing elements 16'b, which are aligned substantially in the vertical direction y, are designed as having wall elements 24, arranged at their end that faces away from the shaft 22. The length of the wall elements 24 corresponds to the width of the air mixing elements 16'b, and the wall elements are perpendicular to the air mixing elements 16'b, pointing substantially in the horizontal direction x.

Using the air deflector device 16' according to FIG. 6 enables the wall elements 19 arranged on the housing 2 according to the embodiment of FIG. 4 to be dispensed with.

Figure 7:
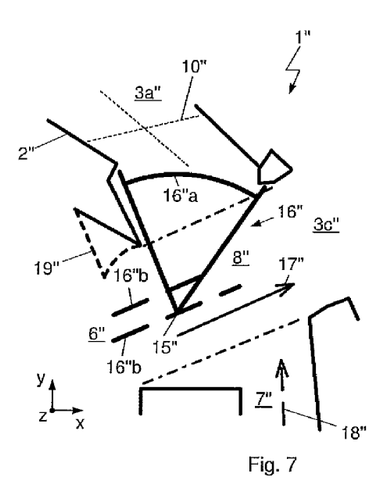
Figure 8:
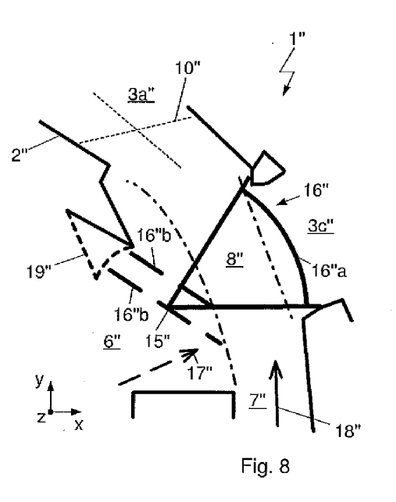

FIGS. 7 and 8 each show a mixing chamber 8" and air vents 3a", 3c" of an air conditioning system 1" comprising an air deflector device 16" with air mixing elements 16"b. In contrast to the embodiment illustrated in FIGS. 2 to 4, a rotational axis 15" of the air deflector device 16" is arranged centrally within a cold air path 6", and not at the margin of the cold air path 6". The air mixing elements 16"b as illustrated in FIG. 7 are aligned parallel to the flow of air in the main direction of flow.

According to FIG. 7, in the "cold air to dashboard air vent" operating mode, the air deflector device 16" is aligned such that the air flows through the housing 2" from the cold air path 6" in a direction of flow 17", with the flow of air from the warm air path 7" being added in, to a dashboard air vent 3c". In FIG. 8, in the "warm air to windshield air vent" operating mode, the air deflector device 16" is aligned such that the flow of air is channeled from the warm air path 7" in the direction of flow 18", with the flow of air from the cold air path 6" being added in, to the windshield air vents 3a".

In the position of the air deflector device 16" according to FIG. 7, the windshield air vent 3a" is closed off by the air deflector device 16", in particular by a closure element 16"a. The dashboard air vent 3c" is open.

In addition to the closure element 16"a, the air deflector device 16" has the air mixing elements 16"b, which are arranged mounted around a common rotational axis 15". The closure element 16"a and the air mixing elements 16"b are rigidly connected to one another. The air mixing elements 16"b are arranged as deflector elements or baffle plates within the flow of air, thus they are also referred to as the air mixing elements.

The closure element 16"a, which is arc-shaped in cross-section within the plane spanned by the horizontal direction x and the vertical direction y, and the air mixing elements 16"b each extend in depth direction z, with the closure element 16"a and one of the air mixing elements 16"b extending over the entire depth of the respective flow passage and other the air mixing elements 16"b being arranged spaced from one another such that the cross-section of the respective passage is merely narrowed. The closure element 16"a is designed as concave in relation to the rotational axis 15", and therefore corresponds to the above-described embodiments.

While the closure element 16"a according to the arrangement of FIG. 7 fully closes off the flow passage to air vent 3a", the air mixing elements 16"b are aligned in the flow direction 17" of the cold air path 6" such that the flow of air flowing in direction of the flow 17" through the cold air path 6" flows nearly unaffected through the mixing chamber 8" to the air vent 3c". In the flow direction 17" of the cold air, there is almost no resistance to flow up to the shaft (not shown) of the air deflector device 16", which is aligned in the direction of the rotational axis 15". The rotational axis 15" is arranged, preferably centered, within the main flow of air from the cold air path 6" to the air vent 3c", indicated by dotted-dashed lines. Flow resistance is minimal, particularly in the operating mode in which unmixed cold air is channeled through the dashboard air vent 3c".

In the position of the air deflector device 16" shown in FIG. 7, in which the dashboard air vent 3c" is open, the air mixing elements 16"b are aligned parallel to the direction of flow 17" of the air through the cold air path 6".

The flow of air flowing through the warm air path 7" can be added to the flow of air flowing through the cold air path 6" in the mixing chamber 8".

In the position of the air deflector device 16" shown in FIG. 8, the dashboard air vent 3c" is closed off by the air deflector device 16", in particular by the closure element 16"a. The windshield air vent 3a" is open.

While the closure element 16"a fully closes off the flow passage to the air vent 3c", the air mixing elements 16"b decrease the flow cross-section of the cold air path 6", causing the flow of air flowing in the direction of flow 17" through the cold air path 6" to swirl upon entering the mixing chamber 8", thereby mixing optimally with the flow of air flowing through warm air path 7". In this case, both the rotational axis 15" of air deflector device 16" and the air mixing elements 16"b are arranged outside of the main flow of air from the warm air path 7" to the air vent 3a", indicated by dotted-dashed lines, and do not influence the flow of air in the direction of flow 18" or influence it only negligibly, which relates particularly to the operating mode in which unmixed warm air is channeled through the windshield air vent 3a".

In the position of the air deflector device 16" shown in FIG. 8, in which the dashboard air vent 3c" is closed, the air mixing elements 16"b are arranged out of parallel alignment, that is, at an angle other than 0° or 180°, in relation to the direction of flow 17" of air through the cold air path 6".

Additional wall elements 19" for improving the blending of air flows channeled through the warm air path 7" and the cold air path 6" are arranged spaced from one another in the depth direction z in such a way that the cross-section of the cold air path 6" is additionally narrowed.

Figure 9:
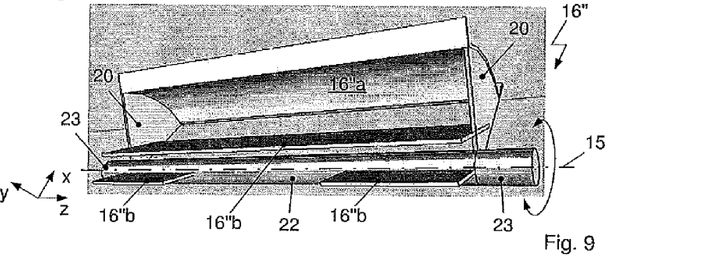
FIG. 9 shows air deflector device from a perspective view with closure element and elements for air mixing.

FIG. 9 shows a perspective view of the air deflector device 16" from FIGS. 7 and 8, with the closure element 16"a and the air mixing elements 16"b as elements for intensifying air mixing.

The air mixing elements 16"b are designed with a straight planar region and four side edges. While one air mixing element 16"b is arranged extending continuously and connected securely between the retaining elements 20 of the closure element 16"a, the air mixing elements 16"b that are designed with one end face connected directly to the shaft 22 are arranged spaced from one another in the depth direction z, so that open spaces are formed between the air mixing elements 16"b. The air mixing elements 16"b that are connected to the shaft 22 have the same length in the direction of the rotational axis 15" or in the depth direction z. All of the air mixing elements 16"b are aligned parallel with one another.

Depending on the position of air deflector device 16", the air mixing elements 16"b are designed either for channeling with almost no pressure loss or for blocking or swirling the flow of air flowing through the cold air path 6".

LIST OF REFERENCE SIGNS

1, 1" air conditioning system
2, 2" housing
3a, 3a" air vent, windshield
3b air vent, footwell
3c, 3c" air vent, dashboard
4 evaporator
5 heating heat exchanger
6, 6" flow path, cold air path
7, 7" flow path, warm air path
8, 8" mixing chamber
9 temperature control damper
10, 10" air damper for windshield air vent 3a
11 air damper for footwell air vent 3b
12 air damper for dashboard air vent 3c
13 direction of air flow
14 direction of air flow in warm air path 7
15, 15" rotational axis
16, 16', 16" air deflector device
16a, 16'a, 16"a closure element
16b, 16'b, 16"b air mixing element
17, 17" direction of air flow through cold air path 6
18 direction of air flow through warm air path 7
19 wall element
20 retaining element of closure element 16a, 16'a, 16"a
21 retaining element of air mixing elements 16b
22 shaft
23 bearing element
24 wall element
x horizontal direction
y vertical direction
z depth direction
α angle

The invention claimed is:

1. An air deflector device for a housing of an air conditioning system in a motor vehicle, comprising:
a closure element rigidly attached to a rotational axis, the closure element extending over an entire depth of a cross section of a flow passage of the housing to be closed off, the closure element including a plurality of retaining elements, the closure element adjusting a cross section of at least one air vent; and
a plurality of air mixing elements rigidly attached to the rotational axis, the plurality of air mixing elements extending along an axial direction of the rotational axis and including at least one cross-flow opening, the plurality of air mixing elements adjusting the cross section of the flow passage, wherein the flow passage includes a first flow path and a second flow path in fluid communication with a mixing chamber, wherein the cross section of the first flow path and the cross section of the second flow path are adjusted based on a position of the air deflector device, and wherein the closure element and the plurality of air mixing elements are rigidly connected to one another and rotated about the rotational axis, and wherein the cross section of the at least one air vent, the cross section of the first flow path, and the cross section of the second flow path are simultaneously adjusted by the closure element and the plurality of air mixing elements, wherein the plurality of air mixing elements is spaced from one another in the axial direction of the rotational axis to form at least one open space between the plurality of air mixing elements, wherein the rotational axis is arranged at one of a boundary and an outside of a majority of air flowing through the mixing chamber, wherein the majority of the air flowing through the mixing chamber flows through the first flow path between the rotational axis and the closure element when the air deflector device is in a first position, and wherein the majority of the air flowing through the mixing chamber flows through the second flow path between the rotational axis and the air mixing element when the air deflector device is in a second position.

2. The air deflector device according to claim 1, wherein the plurality of air mixing elements is arranged spaced from one another in the axial direction of the rotational axis to form at least one cross-flow opening between the air mixing elements.

3. The air deflector device according to claim 1, wherein the closure element is arranged offset about the rotational axis from the plurality of air mixing elements by an angle.

4. The air deflector device according to claim 1, wherein the rotational axis of the air deflector device is a longitudinal axis of a shaft.

5. The air deflector device according to claim 4, wherein the plurality of air mixing elements is arranged on the shaft.

6. The air deflector device according to claim 5, wherein the plurality of air mixing elements includes a flat planar region and four side edges, one of the side edges arranged as an end face directly on the shaft and rigidly connected to the shaft.

7. The air deflector device according to claim 6, wherein the plurality of air mixing elements is arranged in parallel alignment with each other.

8. A housing for an air conditioning system for a motor vehicle comprising:
- a first flow path and a second flow path in fluid communication with a mixing chamber, a first flow of air through the first flow path having a first temperature and a second flow of air through the second flow path having a second temperature;
- a first air vent in fluid communication with the mixing chamber;
- a second air vent in fluid communication with the mixing chamber; and
- an air deflector device disposed in the mixing chamber, the air deflector device having a closure element attached to a rotational axis and extending an entire length of the first flow path and the second flow path, the closure element adjusting a cross section of the first air vent and a cross section the second air vent, and a plurality of air mixing elements attached to the rotational axis and the closure element, the plurality of air mixing elements extending in an axial direction of the rotational axis and including at least one cross-flow opening, the plurality of air mixing elements adjusting a cross section of the first flow path and a cross section of the second flow path, wherein the closure element and the plurality of air mixing elements are rigidly connected to one another and rotated about the rotational axis, and wherein the cross section of the first air vent, the cross section of the second air vent, the cross section of the first flow path, and the cross section of the second flow path are simultaneously adjusted by the air deflector device, wherein the plurality of air mixing elements are spaced from one another in the axial direction of the rotational axis to form open spaces between the plurality of air mixing elements, wherein the rotational axis is arranged at one of a boundary and an outside of a majority of air flowing through the mixing chamber, wherein the majority of the air flowing through the mixing chamber flows through the first flow path between the rotational axis and the closure element when the air deflector device is in a first position, and wherein the majority of the air flowing through the mixing chamber flows through the second flow path between the rotational axis and the air mixing element when the air deflector device is in a second position.

* * * * *